United States Patent [19]
Sewell

[11] Patent Number: 5,152,647
[45] Date of Patent: Oct. 6, 1992

[54] DUNNAGE DEVICE

[76] Inventor: James D. Sewell, 5005 Yarrow Ct., Fair Oaks, Calif. 95628

[21] Appl. No.: 670,833

[22] Filed: Mar. 18, 1991

[51] Int. Cl.⁵ .................. B61D 45/00; B32B 3/12
[52] U.S. Cl. .................. 410/154; 428/116; 206/593; 206/814; 52/807
[58] Field of Search .......... 410/121, 129, 140, 143, 410/154, 124, 125, 153, 155, 156, 120; 428/116, 118, 12, 73; 206/504, 506, 593, 814; 52/806, 807

[56] References Cited

U.S. PATENT DOCUMENTS

| | | | |
|---|---|---|---|
| 2,530,444 | 11/1950 | Woods | 410/155 |
| 3,987,736 | 10/1976 | Miller | 410/125 X |
| 4,372,717 | 2/1983 | Sewell et al. | 410/154 |
| 4,386,881 | 6/1983 | Liebel | 410/154 |
| 4,516,891 | 5/1985 | Wnuk et al. | 410/154 |
| 4,585,381 | 4/1986 | Boyse | 410/154 |
| 5,062,751 | 11/1991 | Liebel | 410/154 |

*Primary Examiner*—Michael S. Huppert
*Assistant Examiner*—James Eller
*Attorney, Agent, or Firm*—Lothrop & West

[57] ABSTRACT

A unitary dunnage device for use with a "singled out" pallet unit being transported within a van, trailer or container. The device includes a pair of void fillers, each being dimensioned and configured to fit within a respective lateral void, existing between the pallet and the container's sidewalls. The void fillers are structurally united and supported in spaced horizontal relation by a suspension structure. The suspension structure has a median portion overlying the pallet unit, and end portions extending from the sides of the pallet unit to the container's sidewalls. The void fillers are attached to and depend from the underside of a respective end portion.

4 Claims, 3 Drawing Sheets

DUNNAGE DEVICE

CROSS REFERENCE TO RELATED APPLICATION

Applicant herein has a currently pending design patent application, Ser. No. 07/533,037, filed Jun. 4, 1990, entitled "Dunnage Device", which discloses an article related to the subject matter of the instant application.

BACKGROUND OF THE INVENTION

1. Field of the Invention

The invention relates generally to the field of structural dunnage devices, adapted to fill voids within a truck, van, or seagoing container so that goods will not shift or topple into these voids, during transit. More particularly, the invention pertains to a dunnage device for use with individual pallet units, or skids, which have been isolated, or "singled out" from the remaining units, to redistribute the entire load throughout the transport container.

2. Description of the Prior Art

Generally representative of a prior art structural dunnage device is the cellular void filler shown in U.S. Pat. No. 4,372,717, issued to Sewell, et al. Such a void filler is typically used between two spaced pallet units, transversely arranged in an elongated transport van, so that the combination of the two units and the void filler spans the width of the van. The void filler of Sewell et al. is further designed to be suspended, or hung, from the top, opposing edges of the units, and to extend downwardly between their opposing faces, substantially to the floor. In this application, the dunnage device prevents side-to-side, or lateral shifting of the units during transit.

Unwanted front to rear displacement of the pallet units is prevented by filling almost the entire length of the van with units, and then placing a rigid bulkhead, constructed from faced corrugated paperboard, within the remaining tailgate void. However, as modern transport vans have become exceptionally long, shippers are occasionally unable to fill the entire van or trailer with goods, for each shipment. This results in smaller, partial loads being sent, and unavoidably increases the number of dunnage devices required to fill the nonutilized space.

It should also be noted that a partial load cannot be concentrated either in the forward, or in the rearward portion of the trailer, for safety reasons. The partial load must be properly distributed between the fore and aft axles of the trailer, by appropriately intermixing pallet units and dunnage devices throughout the length of the van, until the van is filled.

A technique has been developed in the trade called "singling out", for effectively stretching the longitudinal extent of the pallet units included in the partial load. Instead of arranging pallet units in transversely oriented pairs spaced apart by a dunnage device, a single pallet unit is alternatively positioned along the van's center line, and an individual dunnage device is placed within each void between the pallet unit and a respective sidewall of the van. This technique allows the use of lighter duty dunnage devices to resist the moderate lateral forces, while the end-to-end abutting pallet units and bulkheads resist the more powerful fore and aft forces typically encountered during transport.

The transverse dimension, or thickness of the dunnage device typically required to satisfy the pallet unit-to-sidewall void is approximately in the range of 20" to 30". Owing to the substantial weight of such a dunnage device, it must, of necessity, be supported both by the pallet unit and by some means of attachment to the sidewall of the van or container, to avoid sagging or dropping completely. However, efforts to support such a heavy dunnage device by mechanical attachment to the container's sidewall have heretofore been unsuccessful. Many of the vans, trailers, or containers use either fiberglass or relatively thin plywood for sidewall material. Fiberglass is too difficult to nail into, and thin plywood is not strong enough to withstand the repeated breakage and stress.

It is a primary object of the present invention to eliminate this reliance on the two previously required, but unsuccessful, sidewall attachments, and to provide a unitary dunnage device which prevents transit creep of a single pallet unit in either lateral direction. It is also an object of the present invention to provide a dunnage device for single pallet units which can be installed more quickly and easily than prior art devices.

SUMMARY OF THE INVENTION

A unitary structural dunnage device is provided for use with a single pallet unit, or skid, transported within a trailer or van. The pallet unit is located somewhere along the longitudinal axis of the trailer, leaving equal voids, or unused spaces, between the lateral faces of the single unit and the respective sidewalls of the trailer.

The dunnage device includes a pair of void fillers, adapted to resist compressive forces applied against the parallel faces of each filler. The transverse dimension of each filler is slightly less than transverse dimension across each void, allowing the void fillers to be lowered easily into position within a respective void. The void fillers may be constructed from a plurality of horizontal strips of corrugated paperboard, variously attached along their length so as to be expandable from a flat compact stack, into a vertically extending slab of paperboard cells. Alternatively, an inflatable air bladder of appropriate dimensions may be used in lieu of the paperboard void filler.

A suspension structure is used mechanically to join and support both of the void fillers in horizontally spaced, parallel relation, without reliance upon any attachments to the sidewalls of the trailer. A large sheet of corrugated paperboard, having a median portion overlying the upper surface of the pallet unit, and cantilevered free standing end portions extending past the pallet unit and over each void, serves as the suspension structure. The upper end of each void filler is attached to the underside of a respective end portion of the suspension structure, forming a unitary dunnage device for use with the single pallet unit.

DETAILED DESCRIPTION OF THE PREFERRED EMBODIMENT

A unitary dunnage device 10 includes a pair of void fillers 11 and 12, preferably constructed from corrugated paperboard, in a manner well known in the art. Such construction would include a plurality of strips of paperboard, arranged in horizontally stacked relation. The strips are attached to respective underlying and overlying strips at strategic points along their length, usually by means of an adhesive. When the stack of strips is vertically stretched, a plurality of honeycomb-like cells are formed, as shown in the accompanying drawings.

Applicant prefers to use the void filler construction shown in U.S. Pat. No. 4,372,717, in connection with the present invention. Applicant hereby incorporates column 2, lines 26-28, column 3, lines 1-67, column 4, lines 1-67, column 5, lines 1-14, and FIGS. 1 and 2 of that patent by reference, as part of the his disclosure. However, the particular design for the void fillers 11 and 12 is not critical, as long as the fillers are of the appropriate dimensions, and are capable of resisting transverse, or compressive forces applied against outer sidewall faces 13 and inner pallet faces 14.

An acceptable substitute for the cellular void filler just described, is an inflatable air bladder void filler, having the desired size and designed to resist the compressive forces typically encountered. The air bladder may include a paperboard facing on both sides of the bladder which encounter the compressive forces, for additional strength and integrity of the void filler. Also, an air bladder may be combined with either a bulkhead void filler, or a cellular void filler, to achieve the necessary size, configuration, and force resistant characteristics. Such air bladders and hybrid void fillers are well known in the art, and their construction will not, therefore, be described in any greater detail herein.

Figure 3:
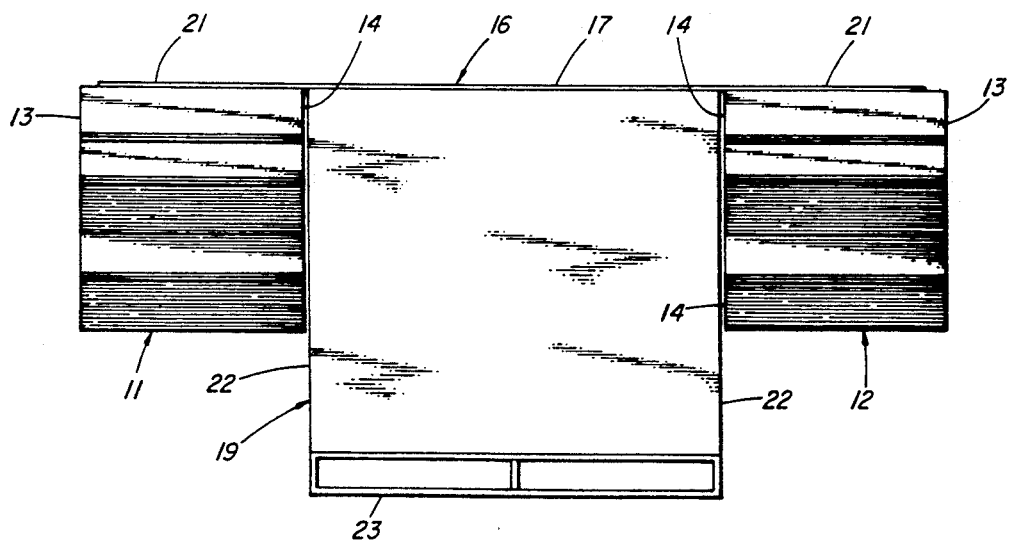
FIG. 3 is an end elevational view, showing the dunnage device and a single pallet unit.
Figure 4:
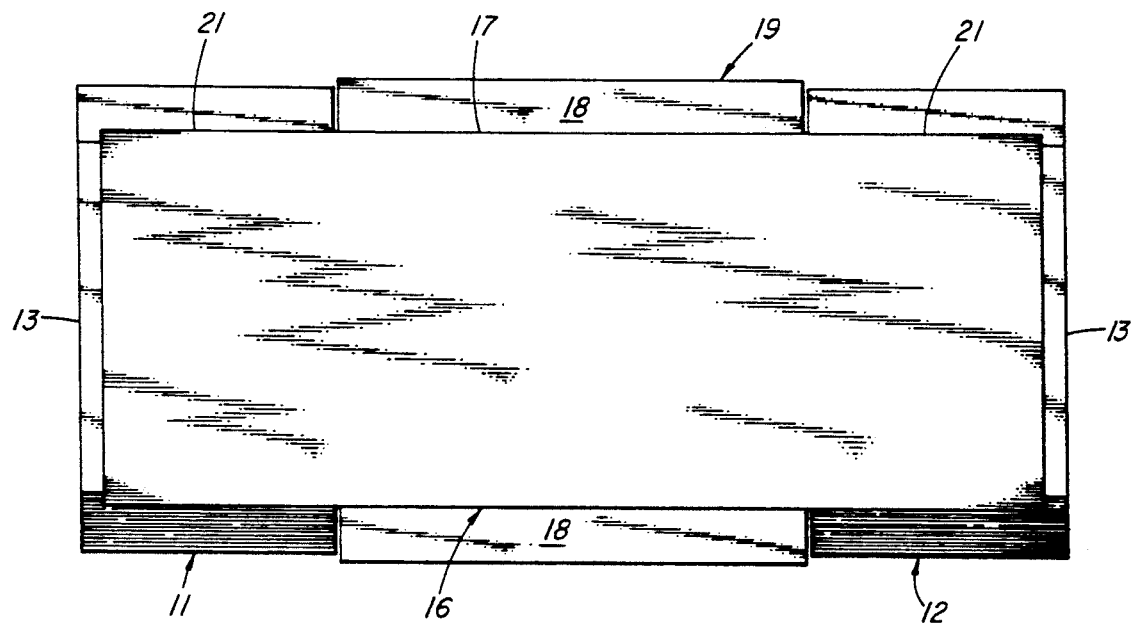
FIG. 4 is a top plan view of the dunnage device and a single pallet unit.
Figure 5:
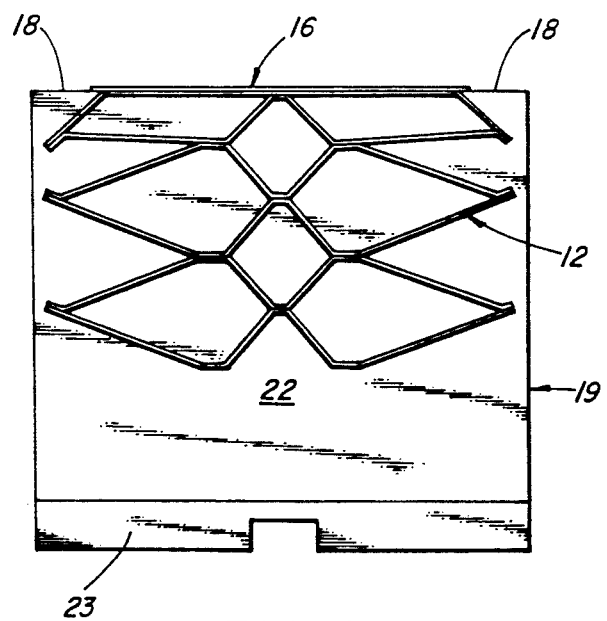
FIG. 5 is a side elevational view of the dunnage device and a single pallet unit.

Dunnage device 10 also includes a horizontally oriented sheet 16, to support void fillers 11 and 12 in horizontally spaced relation. Sheet 16 may be constructed from rigid material, corrugated paperboard, or any other suitable material having sufficient tensile strength to support the two void fillers. As shown most clearly in FIG. 3, sheet 16 maintains inner pallet faces 14 substantially parallel and proximate, and outer sidewall faces 13 substantially parallel and remote. Sheet 16 has a median supported portion 17 which overlies and is generally coextensive with the upper surface 18 of pallet unit 19, or skid. Sheet 16 also includes free standing end portions 21, extending transversely past lateral faces 22 of pallet unit 19.

The upper ends of void fillers 11 and 12 are attached by means of an adhesive, or the like, to the respective undersides of end portions 21. The spacing maintained between the void fillers is such that the inner pallet faces 14 are adjacent, but preferably not touching, respective lateral faces 22 of the pallet unit 19 until the device 10 is completely installed. Thus, the unitary dunnage device 10 can quickly and easily be slipped over pallet unit 19, into ready position for use. After installation, end portions 21 will usually bend slightly under the weight of the void fillers 11 and 12, causing the lower portions of the inner pallet faces 14 to come into resting contact with the lateral faces 22.

Pallet unit 19 is typically assembled from a plurality of separate, smaller containers (not shown) arranged and stacked in a predetermined pattern upon a pallet 23. Stretch wrap or shrink wrap material (not shown) is then wrapped in "barber pole" fashion completely around the stack, against the outward faces of the containers. The stretch wrap material (and the shrink wrap material after heating) forms a cohesive pallet unit 19 from the tightly wrapped containers. Of course, the present invention can also be used to advantage with single large boxes, containers, or other loads not employing wrap material.

Figure 1:
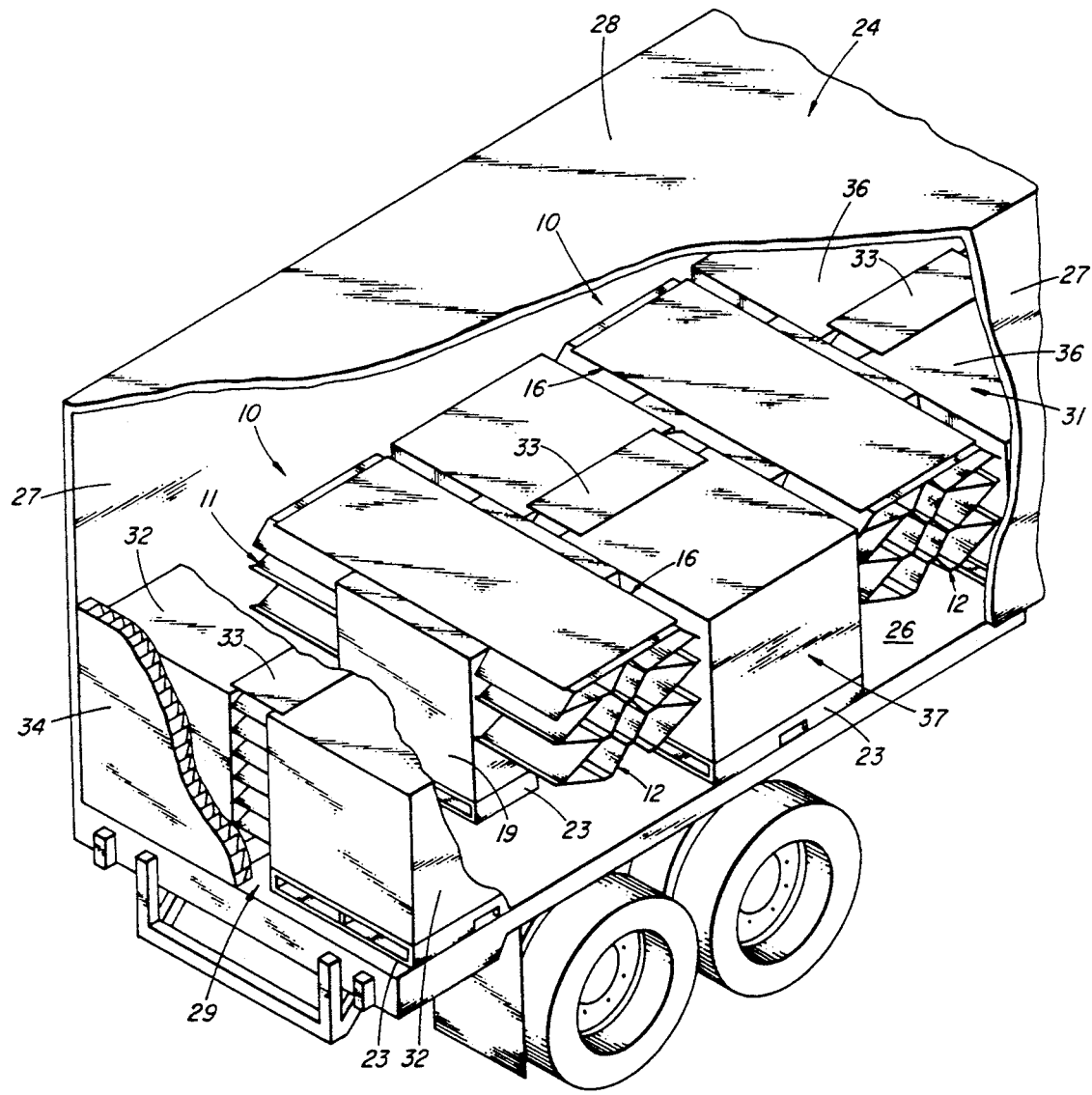
FIG. 1 is a perspective view of the rearward end of a trailer containing a partial load, portions of the trailer roof, sidewall, end doors, rear load, and rear bulkhead being broken away for clarity.
Figure 2:
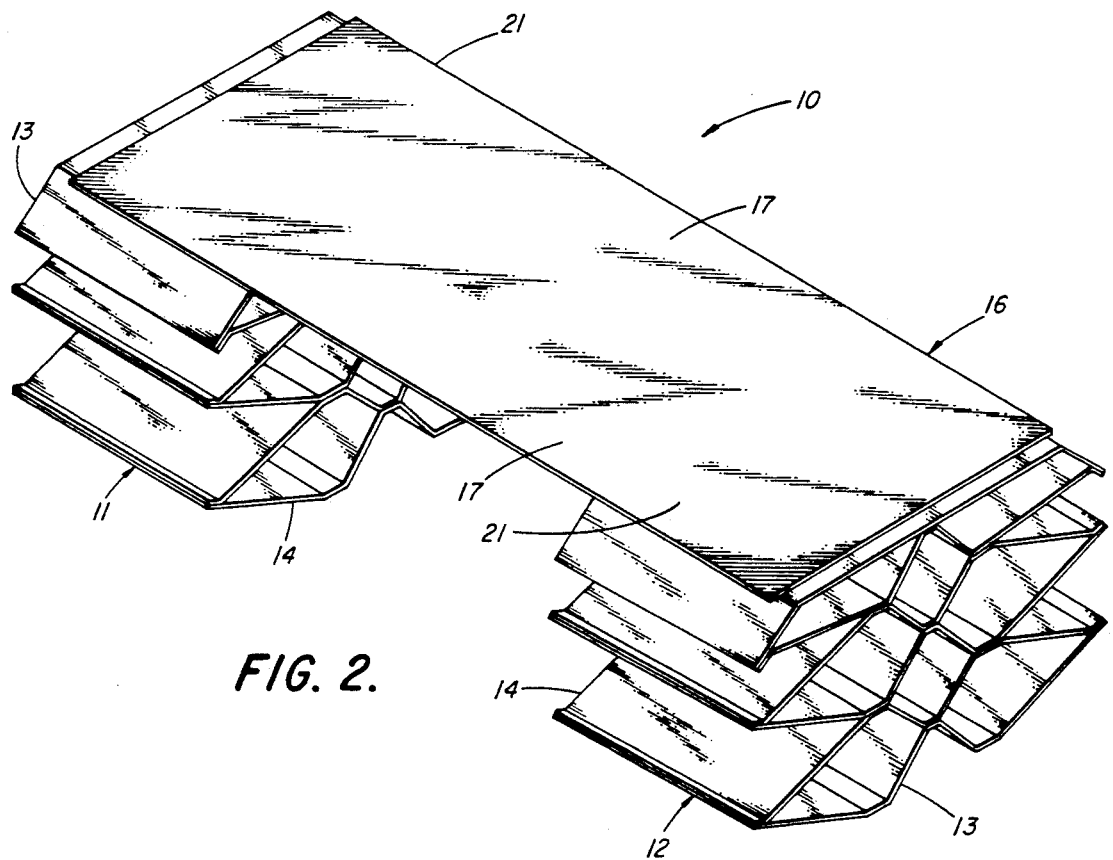
FIG. 2 is a right front perspective view of the dunnage device of the present invention.

The dunnage device 10 and the pallet unit 19 are used within an elongated trailer 24, or van having a floor 26, and upstanding parallel sidewalls 27. Rear doors for the trailer 24 have been eliminated from FIG. 1, for clarity. Portions of a roof 28, a rear load 29, a forward load 31, and one of the sidewalls 27 are broken away to show the partial load of pallets and the dunnage devices contained therein. It will be appreciated that FIG. 1 is shown as a fragmentary, but exemplary representation of an entire trailer, which would typically contain a number of rear loads 29 and forward loads 31, and at least one intermediate pallet unit 19.

Rear load 29 is transversely oriented within the trailer 24, spanning the distance between the sidewalls 27. Load 29 includes a pair of rear pallet units 32, spaced apart by a cellular void filler 33 of conventional design. Void filler 33 is adapted to resist transverse, or compressive forces applied against its two parallel faces, abutting the pallet units 32. Filler 33 is also supported by the opposing upper edges of the pallet units 32. A rigid bulkhead 34, shown in fragment in FIG. 1, fills the void between load 29 and the rear doors of the trailer.

Similarly, forward load 31 includes a pair of forward pallet units 36, spaced apart by a cellular void filler 33. Forward load 31 is also transversely oriented within trailer 24, spanning the distance between the sidewalls 27.

Side to side, or transverse forces applied against the pallet units 32 and 36, are effectively resisted by void fillers 33, preventing any lateral shift or movement of the pallets during transit. Fore and aft, or longitudinal forces applied against the pallet units 32 and 36, are resisted by placing at least one intermediate pallet unit 19, as described above, between loads 29 and 31. Forward load 31, intermediate pallet unit 19, and rear load 29 are therefore arranged in serial, contingent relation, longitudinally spanning the distance between the forward wall and the rear doors of the trailer.

One purpose of using at least one "singled out" pallet unit 19 in this loading arrangement, is to stretch out the effective longitudinal extent of the entire load. By doing so, the load "fills" the trailer without resorting to unnecessary use of the expensive and more difficult to store, rigid bulkheads. "Singling out" also allows a shipper to transport an odd number of pallet units, by using the odd unit as an intermediate pallet unit 19. Whenever an intermediate pallet unit 19 is used in this manner, voids of approximately equal transverse dimensions exist on either side of the unit, between each lateral face 22 and a respective sidewall 27 of the trailer 24. To fill these lateral voids, the unitary dunnage device of the present advantage can be employed to advantage.

Void fillers 11 and 12 are dimensioned longitudinally and transversely, so that when dunnage device 10 is lowered into position, those two voids are satisfied by the fillers. It has also been determined that the vertical extent of void fillers 11 and 12, need not be commensurate with the full height of the pallet unit 19. It is generally sufficient for void fillers 11 and 12 to extend one-third to two-thirds down the length of lateral faces 22, for the dunnage device 10 to perform satisfactorily.

An intermediate load 37, a second intermediate pallet unit 19, and a bulkhead 34 may also be required to satisfy the space available in the trailer 24, as shown in FIG. 1. Intermediate load 37 typically includes a pair of pallet units spaced apart by a void filler, identical to those previously discussed for the forward and rear loads. Since each particular trailer, pallet size, and load size will require different arrangements of the basic components filling the available space, no effort will be made to describe all of the possible permutations for placement and number of these components.

It will be appreciated, then, that I have provided a unitary dunnage device, particularly adapted for effective use with "singled out" pallet units.

What is claimed is:

1. A unitary dunnage device for use within an elongated container having a floor and an upstanding forward wall, an upstanding rear wall, and a pair of upstanding sidewalls, the container including a forward load, an intermediate pallet unit, and a rear load, arranged in serial, contingent relation, longitudinally spanning the distance between the forward wall and the rear wall, the forward and rear loads transversely spanning the distance between the sidewalls, and a pair of equal voids between lateral faces of the pallet unit and the respective sidewalls of the container, the device comprising:

a. a pair of void fillers, each of said void fillers having an inner pallet face in adjacent relation with the respective lateral face of the intermediate pallet unit, and an outer sidewall face in adjacent relation with a respective sidewall, each of said void fillers being adapted to resist compressive forces imposed upon said pallet faces and said sidewall faces; and, b. suspension means comprising a rigid sheet for supporting and structurally interconnecting both of said void fillers within a respective void on either side of the intermediate pallet unit between each said lateral face and each said sidewall, said suspension means having an intermediate portion overlying an upper surface of the intermediate pallet unit, and having cantilevered free standing end portions extending transversely past said lateral faces substantially to a respective said sidewall for supporting a respective void filler, whereby said void fillers are substantially supported by said rigid sheet.

2. A device as in claim 1, in which said rigid sheet has a front to rear dimension substantially identical to that of the underlying intermediate pallet unit, and a lateral dimension substantially spanning the distance between the sidewalls, said void fillers having upper ends attached to respective undersides of said end portions of said sheet.

3. A device as in claim 2, in which said sheet is made from corrugated paperboard, and in which the lower portions of said inner pallet faces rest in abutting relation with the respective lateral faces of the intermediate pallet unit.

4. A device as in claim 1, in which said void fillers are constructed from elongated sheets of corrugated paperboard, attached at various points along their length so as to expand from a flat stack into a cellular slab.

* * * * *